E. C. CARY.
ELECTRIC HEATING TABLE OR COUNTER.
APPLICATION FILED FEB. 24, 1913.
1,084,877.
Patented Jan. 20, 1914.
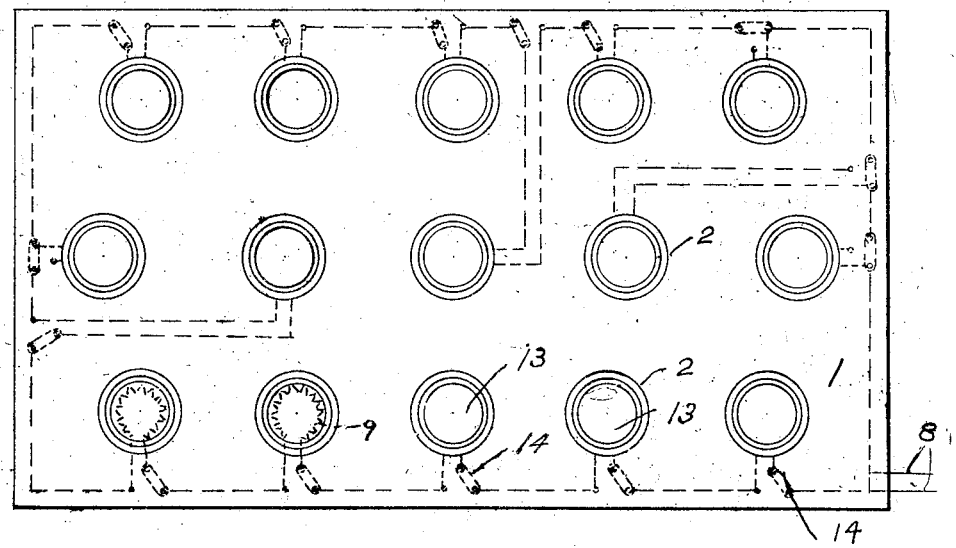
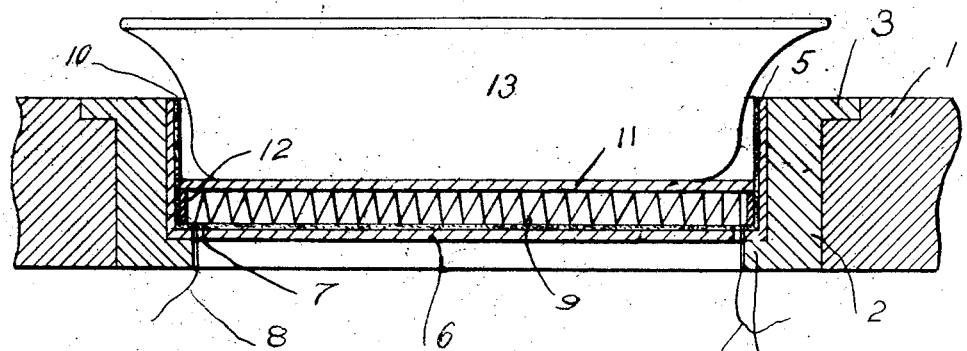
Inventor
E. C. Cary.

UNITED STATES PATENT OFFICE.

ETIENNE C. CARY, OF BALTIMORE, MARYLAND.

ELECTRIC HEATING TABLE OR COUNTER.

1,084,877. Specification of Letters Patent. Patented Jan. 20, 1914.

Application filed February 24, 1913. Serial No. 750,448.

*To all whom it may concern:*

Be it known that I, ETIENNE C. CARY, a citizen of the United States, residing at Baltimore city and State of Maryland, have invented certain new and useful Improvements in Electric Heating Tables or Counters; and I do hereby declare the following to be a full, clear, and exact description of the invention, such as will enable others skilled in the art to which it appertains to make and use the same.

This invention comprehends improvements in heating tables or counters, etc., and relates more particularly to electric heating tables or counters especially adapted for heating the contents of dishes.

The primary object of the invention resides in the provision of a device of this nature, which shall be of extremely simple construction, cheap to manufacture, and utilize practically all of the heat coming from the electric heating coils.

The invention also aims to generally improve devices of this nature to render them more practical, useful, and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a top plan view of my invention, some of the heating coils being shown in dotted lines, Fig. 2 is an enlarged fragmentary vertical sectional view through a portion of my invention, and, Fig. 3 is a sectional view, partly in elevation, showing an incandescent lamp as a heating means.

In the following description and accompanying drawings similar parts will be referred to and designated by like characters of reference.

Referring in detail to the drawings by numerals, 1 designates the top of a table, counter, or similar structure, formed with one or more preferably circular openings in which are positioned the preferably soap-stone rings 2. The top of the table is counter-sunk around each of the openings there-into to receive the annular supporting flanges 3 formed upon said rings, the rings being also provided adjacent their lower edges with the inwardly projecting annular flanges 4. Receptacles 5 of some poor heat conducting material, are supported within the soap-stone rings upon the annular supporting flanges 4. The receptacles 5 are shaped to conform to the interiors of said rings and have bottoms 6 which are apertured, as at 7, to permit the passage therethrough of the electric wires 8, which are continuations of the heating coils 9. The coils are preferably circular in shape so as to extend entirely around the receptacle 5 and are spaced from the interior surfaces thereof by suitable linings 10 of asbestos or similar material. Cover plates or disks 11 are positioned within the receptacles 5 above the heating coils and are supported by annular rings 12. Dishes 13 may be positioned within the receptacles 5 upon the plates 11.

Upon reference to Fig. 1, it will be seen that the heating coils 9 may be easily thrown into or out of circuit by the switches 14, so that any number of dishes 13 may be heated simultaneously. It will be seen from the foregoing description in connection with the accompanying drawings, that practically all of the heat furnished by the heating coils is utilized to heat the cover plates 11 inasmuch as the asbestos linings 10 and receptacles 5 are very poor conductors of heat. It is to be understood that, if desired, the cover plates 11 may be positioned flush with the top of the table 1 so that any articles desired may be conveniently heated by being placed thereon.

In Fig. 3 an incandescent lamp 15 is shown connected to the wires 8 in place of a heating coil 9. Lamps may be used in place of all of the heating coils or may be substituted for any number of said coils and any suitable means may be employed for securing the lamp or lamps in proper position and for connecting the same to the wires 8. The flow of current through the incandescent lamps is controlled by the switches 14. While I have shown the lamp 15 as lying upon the bottom 6, it is to be understood that any means may be employed, if desired, for otherwise supporting the lamp and holding the same in a proper position.

While I have shown the preferred embodiment of my invention, I do not wish to be limited to any special construction of table, counter, etc., but may vary the shape, construction, and arrangement of the different parts, provided I do not depart from the spirit and scope of the invention.

Having thus described my invention, what I claim is:—

In a device of the character described, the combination with a table or counter having a plurality of openings formed therein, the table or counter being counter-sunk about the upper ends of each of said openings, of rings mounted within each of said openings and having radially extending supporting flanges fitting within said counter-sinks, an inwardly extending annular flange formed on the lower terminal of each of said rings, receptacles mounted within each of said openings engaging the walls of said rings and supported by said last mentioned flanges, rings mounted within each of said receptacles, annular plates mounted upon each of said rings, and heating elements disposed between said annular plates and said receptacles.

In testimony whereof I affix my signature in presence of two witnesses.

ETIENNE C. CARY.

Witnesses:
WILLIAM C. COLEMAN,
ROWLAND GOSNELL.